(12) United States Patent
Ruhl et al.

(10) Patent No.: US 8,161,030 B2
(45) Date of Patent: *Apr. 17, 2012

(54) METHOD AND SYSTEM FOR AGGREGATING REVIEWS AND SEARCHING WITHIN REVIEWS FOR A PRODUCT

(75) Inventors: Jan Matthias Ruhl, Mountain View, CA (US); Mayur D. Datar, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/102,023

(22) Filed: May 5, 2011

(65) Prior Publication Data

US 2011/0208669 A1 Aug. 25, 2011

Related U.S. Application Data

(63) Continuation of application No. 11/012,500, filed on Dec. 14, 2004, now Pat. No. 7,962,461.

(51) Int. Cl.
*G06F 17/30* (2006.01)
(52) U.S. Cl. .................................................. 707/706
(58) Field of Classification Search .............. 707/706
See application file for complete search history.

(56) References Cited

U.S. PATENT DOCUMENTS

| | | | |
|---|---|---|---|
| 5,339,257 A | 8/1994 | Layden et al. | 702/84 |
| 5,634,051 A | 5/1997 | Thomson | 395/605 |
| 5,768,142 A | 6/1998 | Jacobs | 364/479.01 |
| 5,842,206 A | 11/1998 | Sotomayor | 707/5 |
| 5,855,015 A | 12/1998 | Shoham | 707/5 |
| 5,983,220 A | 11/1999 | Schmitt | 707/5 |
| 6,029,195 A | 2/2000 | Herz | 709/219 |
| 6,405,175 B1 | 6/2002 | Ng | 705/14 |
| 6,546,399 B1 | 4/2003 | Reed et al. | 707/104.1 |
| 6,569,012 B2 | 5/2003 | Lydon et al. | 463/9 |
| 6,691,112 B1 | 2/2004 | Sigel et al. | 707/10 |
| 6,957,186 B1 | 10/2005 | Guheen et al. | 705/1 |
| 6,963,848 B1 | 11/2005 | Brinkerhoff | 705/10 |
| 6,978,277 B2 | 12/2005 | Reed et al. | 702/102 |
| 7,082,426 B2 | 7/2006 | Musgrove et al. | 707/3 |
| 7,240,049 B2 | 7/2007 | Kapur | 707/3 |
| 7,259,880 B1 | 8/2007 | Wiedemer | 358/1.15 |

(Continued)

FOREIGN PATENT DOCUMENTS

CN 1395206 2/2003

OTHER PUBLICATIONS

Communication, EP Patent Application 05848898.2, Nov. 6, 2009, 7 pages.

(Continued)

*Primary Examiner* — Mark Andrew X Radtke
(74) *Attorney, Agent, or Firm* — Morgan, Lewis & Bockius LLP

(57) ABSTRACT

The embodiments disclosed herein include new, more efficient ways to collect product reviews from the Internet, aggregate reviews for the same product, and provide an aggregated review to end users in a searchable format. One aspect of the invention is a graphical user interface on a computer that includes a plurality of portions of reviews for a product and a search input area for entering search terms to search for reviews of the product that contain the search terms.

21 Claims, 9 Drawing Sheets

U.S. PATENT DOCUMENTS

| | | | |
|---|---|---|---|
| 7,277,926 B1 | 10/2007 | Lee | 709/218 |
| 7,346,549 B2 | 3/2008 | Deas et al. | 705/26 |
| 2001/0032115 A1 | 10/2001 | Goldstein | 705/10 |
| 2001/0044758 A1 | 11/2001 | Talib et al. | 705/27 |
| 2002/0052783 A1 | 5/2002 | Turek et al. | 705/14 |
| 2002/0152114 A1 | 10/2002 | Shumaker et al. | 705/12 |
| 2003/0195754 A1 | 10/2003 | Ford et al. | 705/1 |
| 2004/0064351 A1 | 4/2004 | Mikurak | 705/7 |
| 2004/0093240 A1 | 5/2004 | Shah | 705/2 |
| 2004/0143600 A1 | 7/2004 | Musgrove et al. | 707/104.1 |
| 2004/0225648 A1 | 11/2004 | Ransom et al. | 707/3 |
| 2005/0154769 A1 | 7/2005 | Eckart et al. | 707/201 |
| 2005/0197893 A1 | 9/2005 | Landau et al. | 705/14 |

OTHER PUBLICATIONS

Office Action, EP Patent Application 05848898.2, Apr. 27, 2010, 1 page.

Office Action, U.S. Appl. No. 11/012,500, Apr. 2, 2009, 13 pages.

Final Office Action, U.S. Appl. No. 11/012,500, Nov. 24, 2009, 15 pages.

Office Action, U.S. Appl. No. 11/012,500, Apr. 15, 2010, 14 pages.

Final Office Action, U.S. Appl. No. 11/012,500, Aug. 26, 2010, 6 pages.

Notice of Allowance, U.S. Appl. No. 11/012,500, Nov. 30, 2010, 6 pages.

Final Office Action, U.S. Appl. No. 11/012,846, Nov. 25, 2009, 39 pages.

Dave, K., et al., "Mining the Peanut Gallery: Opinion Extraction and Semantic Classification of Product Reviews," WWW 2003, Budapest, Hungary, May 20-24, 2003.

Hu, M., et al., "Mining Opinion Features in Customer Reviews", Proceedings of Nineteenth National Conference on Artificial Intelligence (AAAI-2004), San Jose, CA, Jul. 2004.

Hu, M., et al., "Mining and Summarizing Customer Reviews," In Proceedings of the 10th ACM SIGKDD Int'l Conf. on Knowledge Discovery and Data Mining, Seattle, Washington, Aug. 22-25, 2004.

Nigam, K., et al., "Towards a Robust Metric of Opinion," Proceedings of Nineteenth National Conference on Artificial Intelligence (AAAI-2004), San Jose, CA, Jul. 2004.

Yi, J., et al., "Sentiment Analyzer: Extracting Sentiments about a Given Topic using Natural Language Processing Techniques," Proceedings of the Third IEEE International Conference on Data Mining, 2003.

Zhu et al., "Anatomy of Web Search Mechanism," Microcomputer Applications, vol. 6, China, 4 pages, Summary in English, 1999.

Chinese Office Action (with summary translation) dated Apr. 17, 2009, issued in Chinese Patent Application for Invention No. 200580047945.8 which corresponds to U.S. Appl. No. 11/012,846.

International Search Report dated Sep. 13, 2007, received in International Application No. PCT/US2005/043459, which corresponds to U.S. Appl. No. 11/012,846 (related).

Office Action dated Mar. 8, 2007, issued in U.S. Appl. No. 11/012,846 (related).

Office Action dated Sep. 27, 2007, issued in U.S. Appl. No. 11/012,846 (related).

Office Action dated Apr. 15, 2008, issued in U.S. Appl. No. 11/012,846 (related).

Office Action dated Nov. 24, 2008, issued in U.S. Appl. No. 11/012,846 (related).

Office Action dated Apr. 2, 2009, issued in U.S. Appl. No. 11/012,846 (related).

METHOD AND SYSTEM FOR AGGREGATING REVIEWS AND SEARCHING WITHIN REVIEWS FOR A PRODUCT

RELATED APPLICATIONS

This application is a continuation application of U.S. application Ser. No. 11/012,500, filed Dec. 14, 2004 now U.S. Pat No. 7,962,461, entitled "Method and System for Finding and Aggregating Reviews for a Product," which is incorporated herein by reference in its entirety.

TECHNICAL FIELD

The disclosed embodiments relate generally to search engines. More particularly, the disclosed embodiments relate to methods, systems, and graphical user interfaces for finding, aggregating, and providing reviews for a product.

BACKGROUND

Many Internet users research a product (e.g., a Canon digital camera) or a service (e.g., a hotel room in Hawaii) before obtaining it. Currently, the approach that many users follow is to use Internet search engines. Users issue a search query that contains the product or service name plus terms like "review" and sift through the myriad of results that are returned by the search engine. While some of these results do contain reviews about the product, many results do not. Moreover, it is very difficult to get a holistic view of all the reviews. In short, this process is fairly cumbersome, time consuming, and inefficient.

Alternatively, users may go to Web sites that provide reviews and ratings for products, such as www.amazon.com, www.epinions.com, and www.circuitcity.com. A few sites, such as www.rottentomatoes.com, movies.yahoo.com, and www.consumersearch.com, aggregate reviews for the same product from several sites. However, some of these sites aggregate reviews manually, which is very inefficient and limits the number of reviews that can be gathered for each product. Moreover, all of these sites are very limited in the tools they provide users to navigate through the reviews.

Thus, it would be highly desirable to provide tools that enable users to more efficiently conduct research on the products and services they are interested in obtaining (e.g., by purchase, lease, rental, or other similar transaction).

SUMMARY

The embodiments disclosed herein include new, more efficient ways to collect product reviews from the Internet, aggregate reviews for the same product, and provide an aggregated review to end users in a searchable format.

In one aspect of the invention, a server collects information containing product reviews for a plurality of products and automatically extracts the product reviews from the collected information. For at least some of the extracted product reviews, the server identifies a particular product that is associated with the extracted product review. For each particular product in at least a subset of the plurality of products, the server generates aggregated review information for the particular product based on a plurality of extracted product reviews that are associated with the particular product. The server stores the extracted product reviews and the aggregated review information.

In another aspect of the invention, a server collects product reviews for a plurality of products and automatically identifies particular products that are associated with particular product reviews. For each particular product in at least a subset of the plurality of products, the server automatically generates aggregated review information for the particular product including frequently appearing phrases in the product reviews associated with the particular product. The server automatically stores the product reviews and the aggregated review information.

As used in the specification and claims, the word "product" refers to both products and services. Moreover, "product" encompasses virtually any product, service or combination thereof that can be bought, leased, rented, or similarly obtained. Exemplary products include, without limitation, consumer products, business products, movies, books, restaurants, hotels, and travel packages.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

DESCRIPTION OF EMBODIMENTS

Methods, systems, and graphical user interfaces are described that show how to find, aggregate, and provide reviews for a product. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention as defined by the appended claims.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well-known to those of ordinary skill in the art are not described in detail to avoid obscuring aspects of the present invention.

Figure 1:
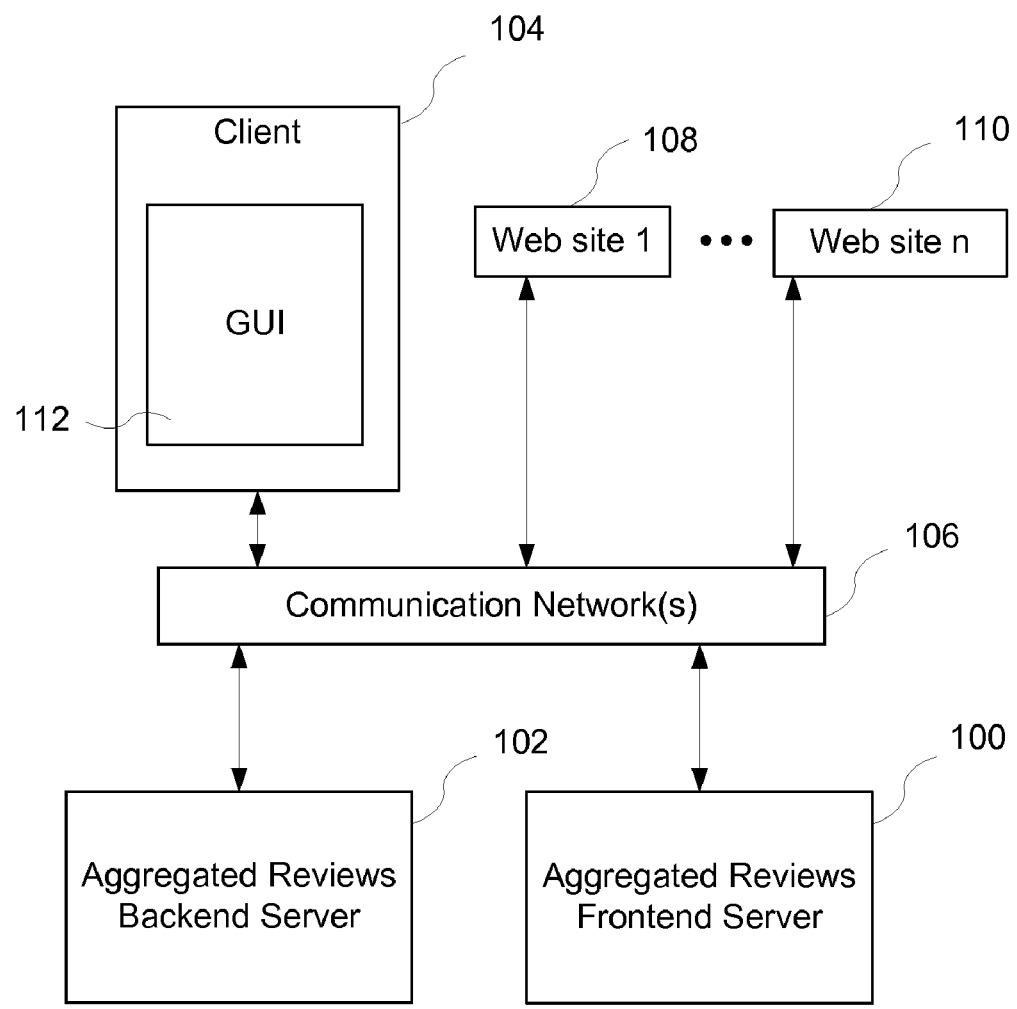
FIG. 1 is a block diagram illustrating an exemplary distributed computer system according to an embodiment of the invention.

FIG. 1 is a block diagram illustrating an exemplary distributed computer system according to an embodiment of the invention. This system includes client computer 104, aggregated reviews backend server 102, aggregated reviews frontend server 100, multiple Web sites such as Web sites 108 and 110, and communication network(s) 106 for interconnecting these components. Client 104 includes graphical user interface (GUI) 112. Aggregated reviews backend server 102 collects product reviews from multiple Web sites 108-110, identifies particular products that are associated with particular product reviews, generates aggregated review information for particular products, and stores the product reviews and the aggregated review information. Aggregated reviews frontend server 100 receives and responds to requests from client 104 to provide an aggregated review for a product and/or to search within reviews for a particular product. GUI 112 includes portions of a plurality of reviews for a product and a search input area for entering search terms to search for reviews of the product that contain the search terms.

Figure 2A:
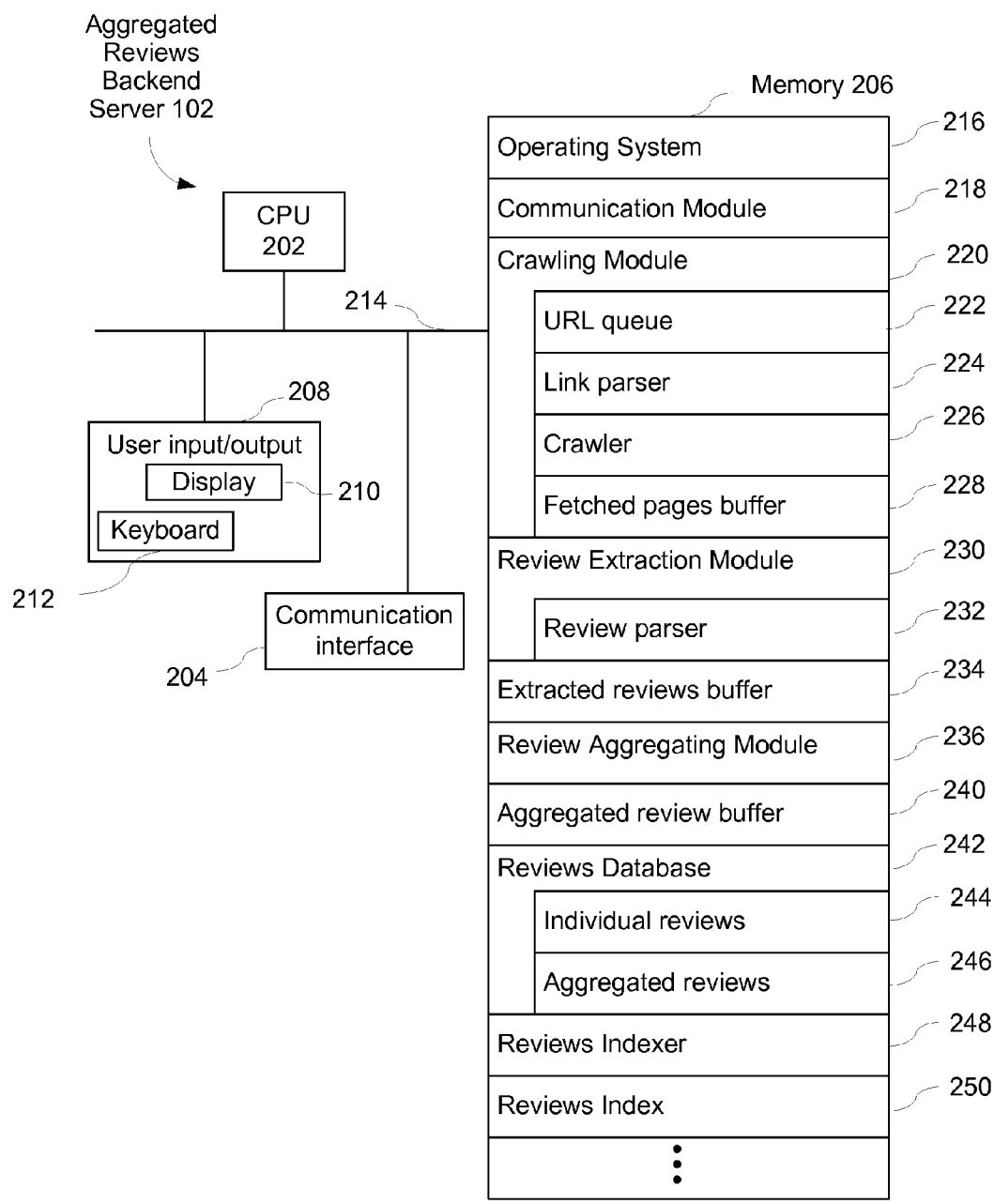
FIG. 2A is a block diagram illustrating an aggregated reviews backend server 102 in accordance with one embodiment of the present invention.

FIG. 2A is a block diagram illustrating aggregated reviews backend server 102 in accordance with one embodiment of the present invention. Server 102 typically includes one or more processing units (CPU's) 202, one or more network or other communications interfaces 204, memory 206, and one or more communication buses 214 for interconnecting these components. Server 102 optionally may include a user interface 208 comprising a display device 210 and a keyboard 212. Memory 206 may include high speed random access memory and may also include non-volatile memory, such as one or more magnetic disk storage devices. Memory 206 may optionally include one or more storage devices remotely located from the CPU(s) 202. In some embodiments, the memory 206 stores the following programs, modules and data structures, or a subset or superset thereof:

- an operating system 216 that includes procedures for handling various basic system services and for performing hardware dependent tasks;
- a communication module 218 that is used for connecting server 102 to other computers (e.g., Web sites 108 and 110) via one or more communication interfaces 204 (wired or wireless), which in turn connect the backend server 102 to one or more communications networks such as the Internet, other wide area networks, local area networks, metropolitan area networks, and so on;
- a crawling module 220 for crawling Web sites (e.g., 108 and 110), which includes
    - a URL queue 222 that stores URLs to be crawled by crawler 226;
    - a link parser 224 that tells crawler 226 how to extract new links to follow from a fetched page;
    - a crawler 226 that fetches web pages, and
    - a fetched pages buffer 228 that temporarily stores web pages fetched by crawler 226;
- a review extraction module 230 for extracting product reviews from the information collected by crawling module 220, which includes a review parser 232 that extracts content pertaining to a review (e.g., the review text, author, and date), as well as content that identifies the product that the review is about (e.g. the product name, model number, and/or other product identifiers), from the fetched pages in buffer 228;
- an extracted reviews buffer 234 that temporarily stores the reviews extracted by review parser 232;
- a review aggregating module 236 that identifies particular products that are associated with particular product reviews and generates aggregated review information for particular products;
- an aggregated review buffer 240 that stores aggregated review information for a product, such as the total number of reviews for the product, an average rating for the product, a distribution of ratings, and/or frequently appearing phrases in the extracted product reviews associated with the product; one or more additional types of aggregated review information may be stored in the aggregated review buffer 240 in other embodiments;
- a review database 242 that stores individual reviews 244 and aggregated reviews 246;
- a review indexer 248 that indexes the reviews (244 and 246) stored in the review database 242 so as produce a reviews index 250; and
- the reviews index 250, which stores the index created by review indexer 248.

The reviews index 250 maps terms (e.g., words and phrases) to reviews. In some embodiments, the reviews index 250 also maps other values, such as ClusterIDs (i.e., product identifiers) or review author names, to the corresponding reviews.

Figure 2B:
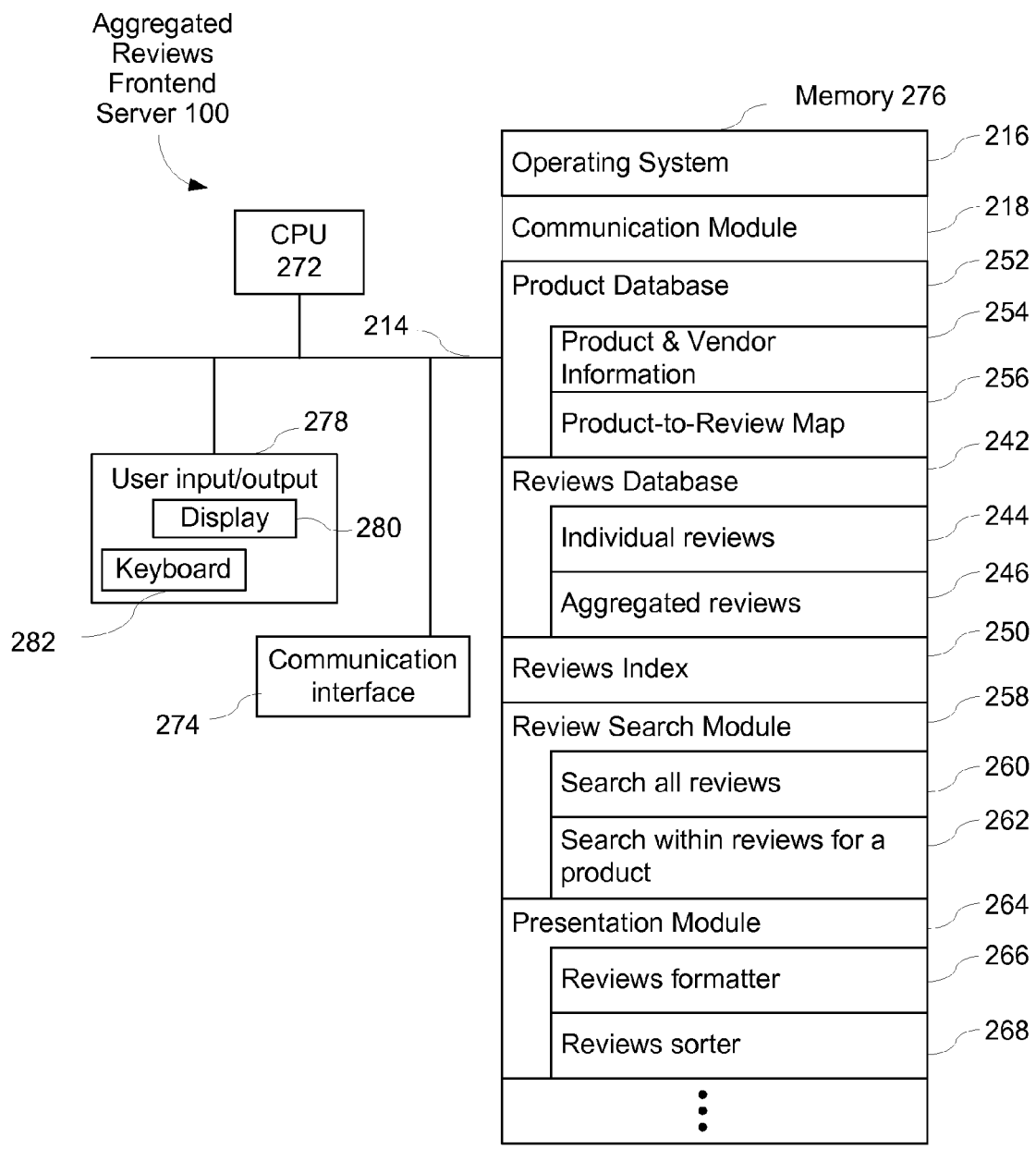
FIG. 2B is a block diagram illustrating an aggregated reviews frontend server 100 in accordance with one embodiment of the present invention.

FIG. 2B is a block diagram illustrating aggregated reviews frontend server 100 in accordance with one embodiment of the present invention. The aspects of FIG. 2B that are analogous to those in FIG. 2A are not described again here. The memory 276 in frontend server 100 stores the following programs, modules and data structures, or a subset or superset thereof:

- an operating system 216, as described above;
- a communication module 218, as described above;
- a product database 252 for storing product-related information, which includes
    - product and vendor information 254 such as product names, models, categories, and purchasing information; and
    - a product-to-review map 256 that associates products in database 252 with their corresponding ClusterIDs (i.e., product identifiers); the ClusterIDs are mapped by the reviews index 250 to individual reviews 244 and aggregated reviews 246;
- reviews index 250, as described above;
- a review search module 258 that answers search requests, which includes
    - a "search all reviews" application 260 for searching all reviews in reviews database 242; and
    - a "search within reviews for a product" application 262 for searching within the set of reviews for a particular product, to identify those reviews containing one or more search terms; and
- a presentation module 264 for formatting aggregated reviews and search results for display, including
    - a reviews formatter 266 for formatting individual reviews and aggregated review information for display; and
    - a reviews sorter 268 for sorting the reviews for a particular product in any of the following ways, or a subset or superset thereof: by date, review source (e.g., by website), review quality, or review relevance to one or more search terms.

The reviews database 242 and reviews index 250 are generated by the backend server 102, and are copied from the backend server to the frontend server 100 for responding to user requests for product review information.

Referring to FIGS. 2A and 2B, each of the above identified modules and applications corresponds to a set of instructions for performing a function described above. These modules (i.e., sets of instructions) need not be implemented as separate software programs, procedures or modules, and thus various subsets of these modules may be combined or otherwise re-arranged in various embodiments. In some embodiments, memory 206 or 276 may store a subset of the modules and data structures identified above. Furthermore, memory 206 or 276 may store additional modules and data structures not described above.

Although FIGS. 2A and 2B show servers 100 and 102 as a number of discrete items, FIGS. 2A and 2B are intended more as functional descriptions of the various features which may be present in servers 100 and 102 rather than as a structural schematic of the embodiments described herein. In practice, and as recognized by those of ordinary skill in the art, items shown separately could be combined and some items could be separated. For example, some items shown separately in FIGS. 2A and 2B could be implemented on single servers and single items could be implemented by one or more servers. The actual number of servers used to implement backend server 102 and frontend server 100 and how features are allocated among them will vary from one implementation to another, and may depend in part on the amount of data traffic that the system must handle during peak usage periods as well as during average usage periods.

Collecting Product Reviews

Figure 3:
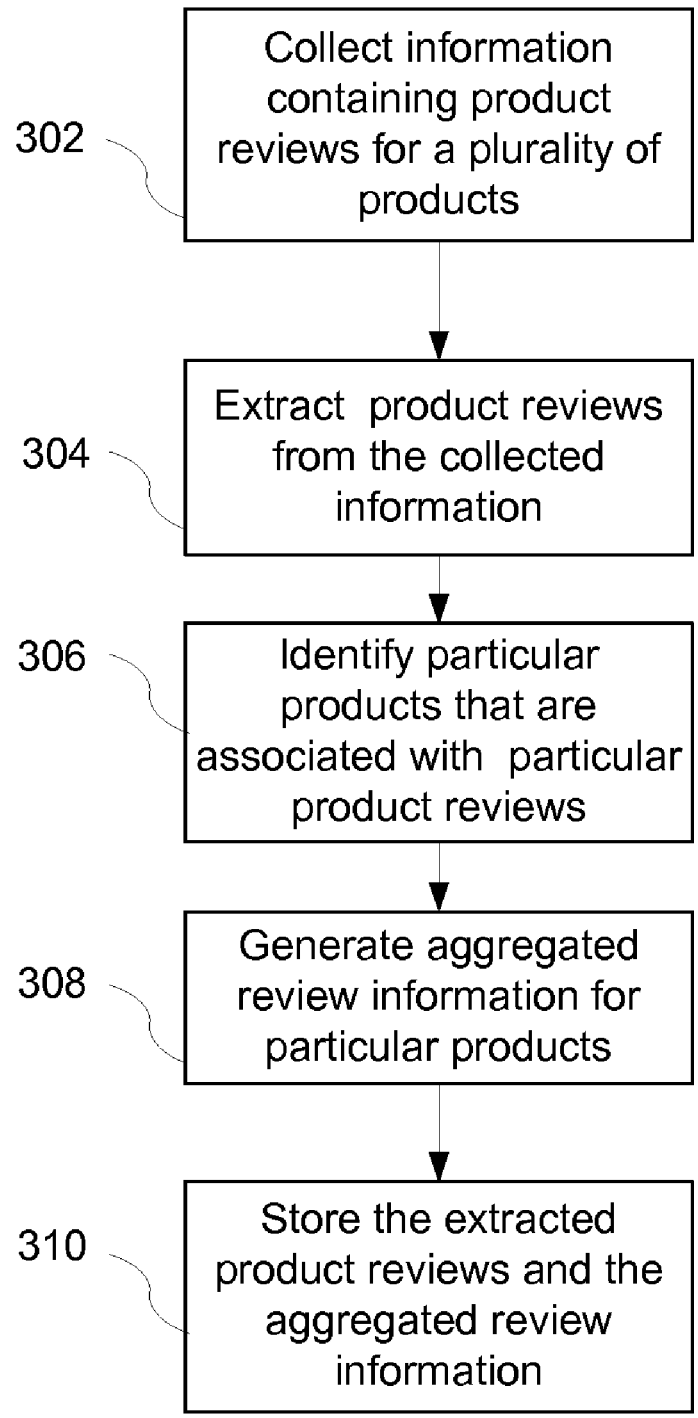
FIG. 3 is a flowchart representing a method for collecting and aggregating reviews for a product according to one embodiment.

FIG. 3 is a flowchart representing a method for collecting and aggregating reviews for a product according to one embodiment. The process shown in FIG. 3 is performed by aggregated reviews backend server 102 (FIGS. 1 and 2A). It will be appreciated by those of ordinary skill in the art that one or more of the acts described may be performed by hardware, software, or a combination thereof, as may be embodied in one or more computing systems.

Backend server 102 collects product reviews, or information containing product reviews for a plurality of products (302).

In some embodiments, collecting information comprises selectively crawling review-related Web sites or portions thereof and retrieving information containing product reviews. Selective crawling differs from traditional crawling in that the crawler only follows selected links on Web pages, rather than all links.

To initiate a crawl, crawling module 220 is given a set of starting (sometimes called "seed") URLs (Uniform Resource Locators, i.e., web addresses) to crawl.

Crawling module 220 puts these URLs in queue 222. Crawler 226 continuously fetches pages corresponding to the URLs in the queue 222 until either there more no more URLs in the queue 222, or a crawl termination condition is reached. In some embodiments, link parser 224 tells crawler 226 how to extract new links to follow from a fetched page by matching regular expression patterns. In some embodiments, link parser 224 tells crawler 226 how to extract new links to follow from a fetched page by using text classification techniques. As an example of the former approach, Table 1 contains pseudo code for a link parser 224 that selects which links to follow on an exemplary website (www.productcompany.com) for reviews of electronics products.

TABLE 1

Exemplary Pseudo Code for Crawling Module with Link Parser

Initialize crawler queue with seed page(s) from the www.productcompany.com website;
For each URL in the queue, do the following {
    download page from URL, and remove the URL from the queue;
    extract product reviews, if any, on the page, and parse and store the extracted product reviews;
    search page to see if any portion of the page matches any predefined pattern in a set of predefined patterns (contentpattern1, contentpattern2, ...);
        if the page does not match any of the one or more predefined patterns {
            processing of the page is complete;}
    // otherwise, continue processing the page
    collect all links on the page;
    process each link as follows {
        if the URL of the link matches any predefined pattern in a set of predefined patterns (linkpattern1, linkpattern2, ...) OR
        if the anchor text of the link matches any predefined pattern in a set of predefined patterns (anchorpattern1, anchorpattern2, ...), do the following: {
            optional: remove unneeded fields from the URL of the link;
            put the URL of the link on the crawler queue;}
    } // Links that do not match any of the predefined pattern(s) are not put on the queue
    // The patterns used in the processing of the crawled pages may be specific to the
    // website from which product review information is being extracted.

Crawler 226 outputs the crawled pages to fetched pages buffer 228. In some embodiments, the fetched pages buffer may contain one or more files or other data structures. For each page that is fetched, link parser 224 parses the page and attempts to extract links (URLs) to follow that, if found, are added to queue 222. As noted above, in contrast to traditional crawls, not all the links in a page are followed by the crawler. Rather, only those links that parser 224 identifies as potentially leading to review pages are followed. For instance, parser 224 may identify such links based on the presence of terms or patterns in the URLs of the links, or based on the anchor text of the links. Anchor text is text contained in or otherwise associated with a link.

The information containing product reviews can be collected from a wide variety of sources, including web pages and forum postings. In some embodiments, the web pages comprise Web pages of review-related Web sites and/or product-related Web sites.

In some embodiments, collecting information comprises receiving product reviews in a predetermined digital format, for example as data streams from multiple product reviewers. The predetermined digital format of the product reviews may comprise key/value pairs, or data organized in predefined data structures. In some embodiments, collecting information comprises selecting information from a repository of information collected by a web crawler.

Backend server 102 automatically extracts product reviews from the collected information (304). In particular, review parser 232, which is analogous to link parser 224, extracts content pertaining to a review (e.g., the review text, author, and date), as well as content that identifies the product that the review is about (e.g. the product name, model number, or other features), from the fetched pages in buffer 228. The extracted information is stored in extracted reviews buffer 234. In some embodiments, extracted reviews buffer 234 contains a list of key/value pairs denoting the extracted product review information, such as the review author, content, publisher, and so on.

The information extracted from a single web page may correspond to multiple reviews. In some embodiments, each extracted review found on a web page is encoded and stored in a respective review record in the extracted reviews buffer 234. Table 2 lists the fields of each review record in the extracted reviews buffer 234 in an exemplary embodiment. In other embodiments, each review record may have a subset of the fields listed in Table 2, and may also include additional fields. For example, in some embodiments, the review records might not include the ReviewType and CrawlDate fields. In some embodiments, the Rating field may be a numeric field, instead of a string field. Alternately, in some embodiment, each review record may include both a string Rating field and a normalized numeric rating field (e.g., normalized with respect to a rating scale of 0 to 1, or 0 to 5).

In Table 2, the keyword "required" indicates a required field, "repeated" indicates a field that may occur more than once in a record (and in rare cases, may have zero occurrences), and "optional" indicates an optional field. Optional fields may be present in some review records, while not present in other review records, for example because some reviews may not include the optional information.

TABLE 2

Exemplary Fields for Individual Review Records in Individual Reviews Buffer and Reviews Database

| | |
|---|---|
| required int64 ReviewID | // unique identifier for each review |
| repeated string ProductNames | // one or more product names associated with the review |
| required int32 ReviewType | // exemplary values: editorial=1, user=2 |
| required string Rating | // product rating given by the reviewer |
| optional string Author | // author of the review |
| optional string Title | // title of the review |
| optional string Summary | // review summary |
| optional string Content | // review content, which is the main body of the review |
| optional string Date | // Review date |
| required int32 CrawlDate | // crawl date |
| required string URL | // URL at which review was found.<br>// Alternately, this may be the base URL for product<br>// reviews at the website at which this review was found |
| required string Publisher | // publisher of the review (e.g., CNET, epinions.com) |

TABLE 2-continued

Exemplary Fields for Individual Review Records in Individual Reviews Buffer and Reviews Database

| | |
|---|---|
| // Additional Optional Fields that may be included in some embodiments: | |
| optional int64 ClusterID | // ClusterID of the product |
| optional float QualityScore | // Quality Score of the review |
| optional int32 Year | // Model year, or other year associated with the product<br>// (e.g., year of first publication of a book or a movie) |

The data structure fields shown in Table 2, except ReviewID, ReviewType, QualityScore and ClusterID, are filled with data from the extracted review information if information relevant to those fields are found in the extracted review information. The ReviewID is a unique identifier assigned to each individual review by the aggregated reviews backend server. The ReviewType indicates whether the review is an editorial review, or a review submitted by a user. QualityScore, which provides a measure of the quality of a review, is determined based on the review's length and word entropy (which measures, among other things, the diversity of the words or terms used in the review). As explained below, all reviews belonging to the same product form a "cluster" and the ClusterID identifies the cluster to which a review belongs.

Clustering Reviews (Identifying Reviews for the Same Product)

Backend server 102 automatically identifies particular products that are associated with particular product reviews (306). For at least some of the extracted product reviews, backend server 102 identifies a particular product that is associated with the extracted product review.

In some embodiments, identifying a particular product that is associated with the extracted product review comprises associating a unique number or string in the extracted product review with a particular product. In some embodiments, the unique number or string is a product model number. In some embodiments, the unique number is an ISBN number.

In some embodiments, identifying a particular product that is associated with the extracted product review comprises associating a brand name and a model number in the extracted product review with a particular product. In some embodiments, identifying a particular product that is associated with the extracted product review comprises associating a brand name, a model number, and a product category in the extracted product review with a particular product.

Different web sites often use different names for the same product, which makes it difficult to automatically determine whether two reviews actually refer to the same product. For example, different web sites refer to the same Canon scanner as:

Canon CanoScan 7890a002 Flatbed 7890a002
Canon CanoScan LiDE 30
Canon CanoScan LiDE 30 Scanner
Canon CanoScan LiDE 30 Color Scanner
Canon Lide 30 (7890A002)

For products with global identifiers (such as ISBN numbers for books), identifying a particular product that is associated with the extracted product review is simple if the product review includes the global identifier. In some embodiments, in the absence of such a global identifier in the review, extracted brand names and model numbers (in the above example, the brand name is "canon", and the model numbers are "lide30" and "7890a002"), as well as category information (such as the fact that the above product is a scanner) are used to identify reviews that refer to the same product. As used herein, reviews about the same product form a "cluster" and "clustering" refers to identifying reviews for the same product. As described above, in some embodiments, this information is stored in review records (Table 2) by review extraction module 230. Extracted brand names, model numbers and category information may all be stored in the ProductNames fields of the review records. Alternately, in some embodiments each review record may include a Model field for storing a model number, a Category field for storing product category information, and a Names field for storing brand name information for a respective product.

Sometimes, one or more of these three pieces of information (Model, Category and Brand Name) are not explicitly identified on a web page. In such cases, this information is deduced from the title string or other fields of the extracted review. For example, product category and model number can be inferred by the review parser 232 or the review aggregating module 236 as follows. Given a title string, the part of the title string beyond words like "for", "with", and "featuring" is ignored. Words in the title string are traversed from right to left and the first word (or pair of words) that is included in a data file containing a predefined list of product categories is considered the product category. In some embodiments, this data file also identifies, for each distinct product category, a list of other product category names for the product category that are mapped to one canonical name. For example, "notebooks", "notebook", "laptop" or "laptops" may all be mapped to the canonical name, "notebooks". Thus, a title string such as "Canon canoscan lide 30 color scanner with free extras" would be mapped to the category "scanner".

To extract model numbers, the title string is traversed from left to right and the first word that contains digits (i.e., characters from '0'-'9') is concatenated with the preceding word to form a model number. In some embodiments, the resulting model number is discarded if it matches any of the regular expression patterns corresponding to blacklisted model numbers or contains a brand name or parts of a brand name. An example of a blacklisted pattern is "pentium \d+" +" (i.e., "pentium" followed by a string of digits). For the title string in the previous example, "lide 30" is extracted as the model number. Note that more than one model number can be inferred for a product name.

In some embodiments, the brand names are identified by matching words in the product title with known (i.e., predefined) brand names in a list or dictionary of such brand names. In some embodiments, the brand name of a product may be extracted from the URL of the page on which the product review is found.

In some embodiments, two product reviews are assigned to the same cluster (product) if they have the same exact brand name, and agree on their model numbers and categories. Two reviews are said to agree on a model number if the set of model numbers extracted for them have a non-empty intersection. Two categories are said to agree if they are the same or at least one of them is unknown.

In some embodiments, two product reviews are assigned to the same cluster (product) if they have the same exact brand name and agree on their model numbers.

In some embodiments, reviews corresponding to products for which brand or model information cannot be determined are put into a singleton cluster of their own and are not clustered with any other reviews.

In some embodiments, when a product review is assigned to a cluster, review aggregating module 236 fills in the ClusterID field in the review record for the extracted review.

Generating Aggregate Information

For each particular product in at least a subset of the plurality of products, backend server 102 generates aggregated review information for the particular product based on a plurality of extracted product reviews that are associated with the particular product (308). In some embodiments, review aggregating module 236 uses the reviews for a particular product to generate aggregated review information for the product that is stored in aggregated review buffer 240.

In some embodiments, the aggregated review information for the particular product comprises a total number of reviews for the product, an average rating for the product, a distribution of the ratings for the product, and/or frequently appearing phrases in the extracted product reviews associated with the product. One or more additional types of aggregated review information may be included in the aggregated review information in other embodiments.

In some embodiments, the average rating is the average of weighted ratings from different web sites. In some embodiments, the weight of a single review on a web site with K reviews for the same product is 1/K. In some embodiments, the weight given to reviews from a particular web site or reviewer can be personalized by a user. For example, a user can specify via a preferences dialog box one or more web sites (e.g., www.consumerreports.org) and/or reviewers (e.g., Roger Ebert) preferred by the user. The ratings given in the reviews associated with the user's preferred sources are then given higher weight when computing an average rating for a product. In one embodiment, the ratings given in reviews associated with the user's preferred sources are given N times the default weight assigned to those reviews, where N is a value such as 2, 2.5, 3 or any other appropriate value greater than 1. An exemplary representation of the average rating computation is:

$$\text{average rating} = \frac{\sum a_i \text{rating}_i}{\sum a_i}$$

where $a_i$ represents the weight given to each rating, $\text{rating}_i$, of each respective review i.

In some embodiments, frequently appearing phrases in the extracted product reviews associated with a particular product are computed by review aggregation module 236 as follows. For all the phrases (e.g., unigrams, bigrams or trigrams that do not span across sentences) that occur in reviews associated with a product (cluster), the number of their weighted occurrences is counted. Occurrences in the review title or summary are given a higher weight. When computing or selecting frequently appearing phrases, all stop words and words that occur in the title of the product name are ignored. Each phrase is given a score equal to the length of the phrase times the square root of the sum of weighted occurrences of the phrase. A predetermined number of phrases with the highest scores (e.g., the top 6, 7, 8, 9 or 10 phrases) that do not overlap each other are chosen as the frequent phrases and stored in aggregated review buffer 240.

Table 3 lists the fields of each aggregated review record, produced by aggregating information from all the extracted reviews for a particular product, and stored in the aggregated reviews buffer 240. In other embodiments, each aggregated review record may have a subset of the fields listed in Table 3, and may also include additional fields. A separate instance of the aggregated review record is included in the aggregated reviews buffer 240 and in the reviews database 242 for each distinct product. In this example, each aggregated review record includes a ClusterID (identifying the product associated with this record), a list of ReviewID's (each of which is uniquely associated with a review of the product), a list of the words or phrases most frequently found in the reviews of the product, and a computed average rating of all the reviews for the product. In some embodiments, an aggregated review record also includes one or more of the following additional fields: a string identifying the product, a number specifying the number of reviews in the cluster; and data concerning the distribution of ratings in the reviews for a product, such as the number of reviews with low, medium and high ratings, as well as the number of reviews having no product rating.

TABLE 3

Exemplary Fields for Aggregated Review Records in
Aggregated Reviews Buffer and Reviews Database

| | |
|---|---|
| required int64 ClusterID | // this is the ClusterID for a particular product |
| repeated int64 ReviewID | // this represents a list of ReviewID's, // which are the IDs of the individual reviews for the product |
| repeated string FrequentPhrases | // This is a list of phrases that // frequently occur in the reviews of the product |
| required float AvgRating | // This is the average rating for the product |
| // Additional Optional Fields that may be included in some embodiments: | |
| optional int32 ReviewNum | // number of reviews in cluster |
| repeated string ProductName | // name(s) of Product to which this cluster belongs |
| repeated int32 ScoreDistribution | // score distribution for: unrated, // negative, neutral, and positive reviews |

Backend server 102 automatically stores the extracted product reviews 244 and the aggregated review information 246 in reviews database 242 (310). In some embodiments, each stored product review in the reviews database 242 comprises a record that includes the same information as the corresponding review record (Table 2) stored in the extracted reviews buffer 234, while in other embodiments, the stored product review may comprise a subset of the information stored in the corresponding review record.

As mentioned earlier, reviews indexer 248 indexes the individual product reviews 244 and the aggregated review information for a product 246 and stores the results in reviews index 250.

Displaying an Aggregated Review

Figure 4:
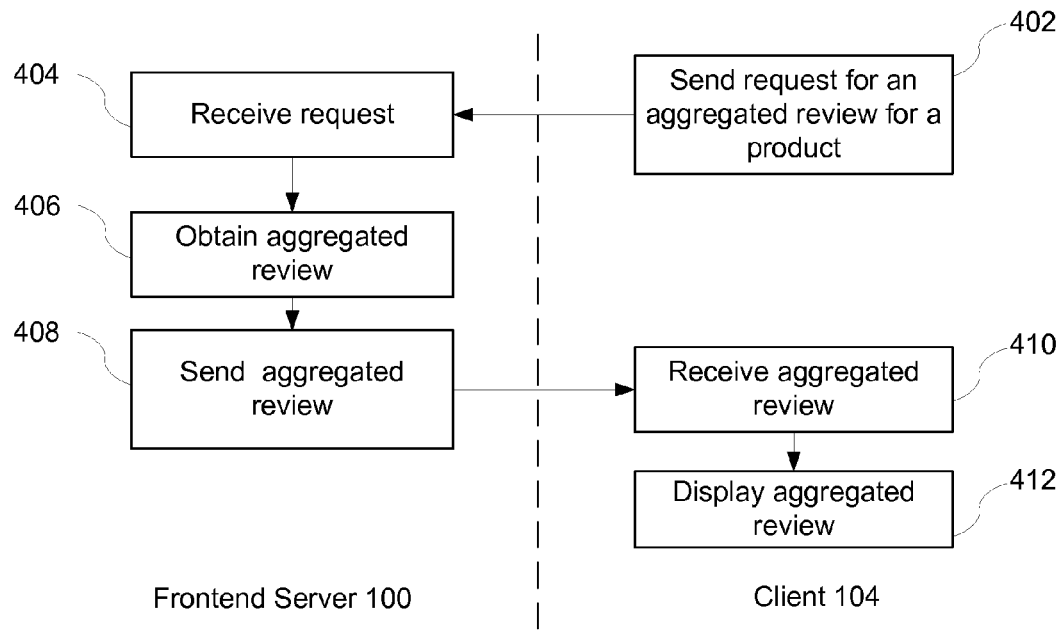
FIG. 4 is a flowchart representing a method for displaying an aggregated review for a product according to one embodiment.
Figure 6A:
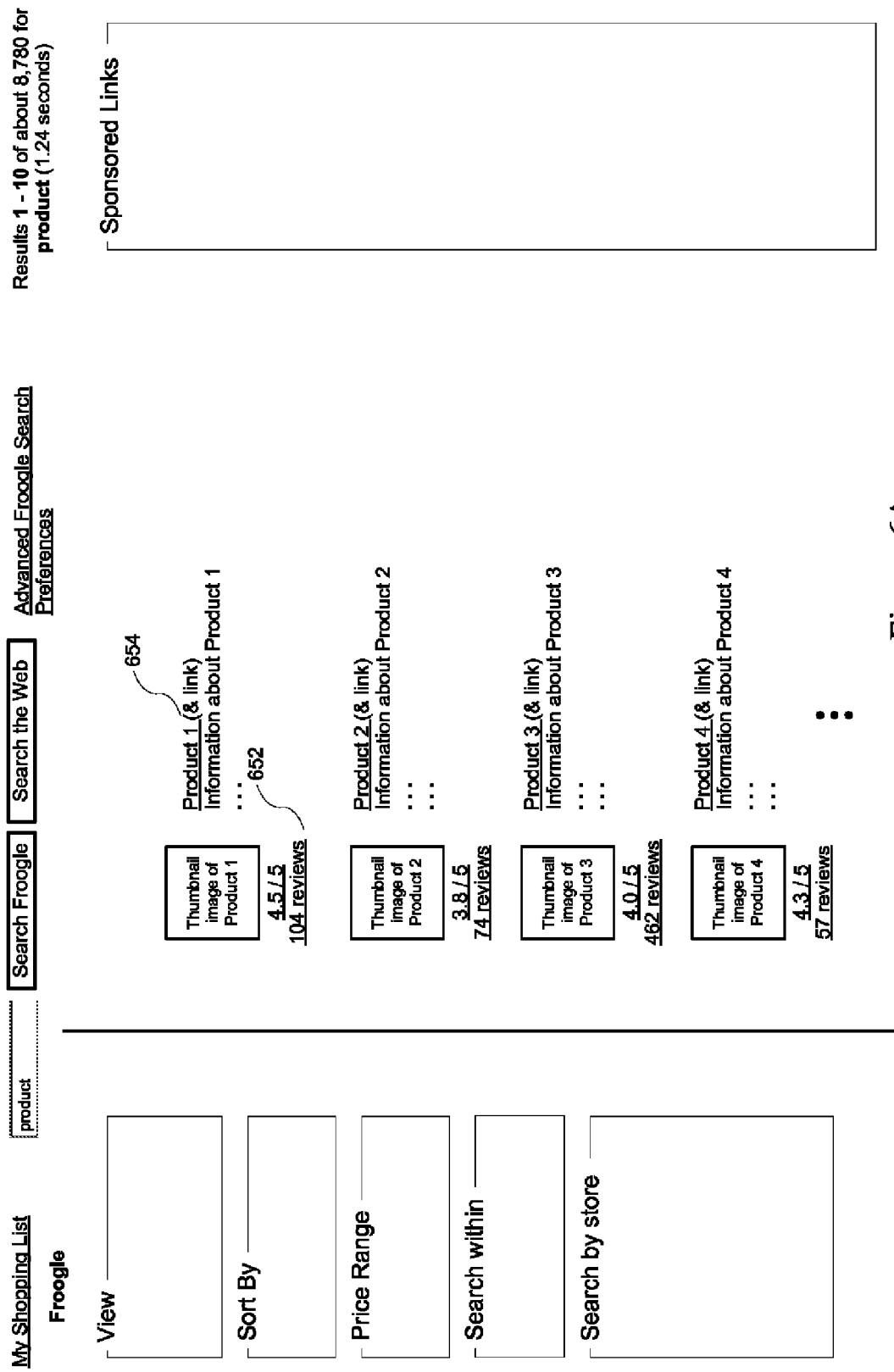
FIGS. 6A-6D are schematic screen shots of an exemplary graphical user interface of a product information module (FIG. 6A) and a product review presentation module (FIGS. 6B-6D) according to one embodiment.

Client 104 sends a request for an aggregated review for a product (402, FIG. 4). In some embodiments, the request is sent in response to a user-initiated activity, such as a user clicking on a hyperlink. For example, referring to FIG. 6A, a user looking at web page 650 with various products for sale could activate hyperlink 652 to see an aggregated review for product 654.

Referring to FIG. 4, frontend server 100 receives the request (404) for an aggregated review for a product and obtains (406) the aggregated review. In some embodiments, product information 254 in product database 252 is linked to aggregated reviews for the corresponding products by product-to-review map 256. In some embodiments, map 256 contains mappings of product identifiers used by a first website or service (e.g., a product information website) to the ClusterIDs used by the frontend server 100. The process of assigning product identifiers to products in the first website or service may be analogous to the process described above for identifying particular products that are associated with particular product reviews. In some embodiments, map 256 is determined by matching a global identifier for a particular product (e.g., an ISBN number) in product database 252 with a corresponding review cluster. Product-to-review map 256 is used to identify the aggregated review (in the reviews database 242) corresponding to a product. Presentation module 264 formats the aggregated review. In some embodiments, the reviews index 250 is used to identify the individual reviews corresponding to the aggregated review for a product. More specifically, the reviews index 250 maps the ClusterID of the aggregated review to the individual reviews for the product associated with the aggregated review.

Frontend server 100 sends (408) the aggregated review to client computer 104 via communications network 106. Client 104 receives (410) and displays (412) the aggregated review 600 (FIG. 6B).

Figure 6B:
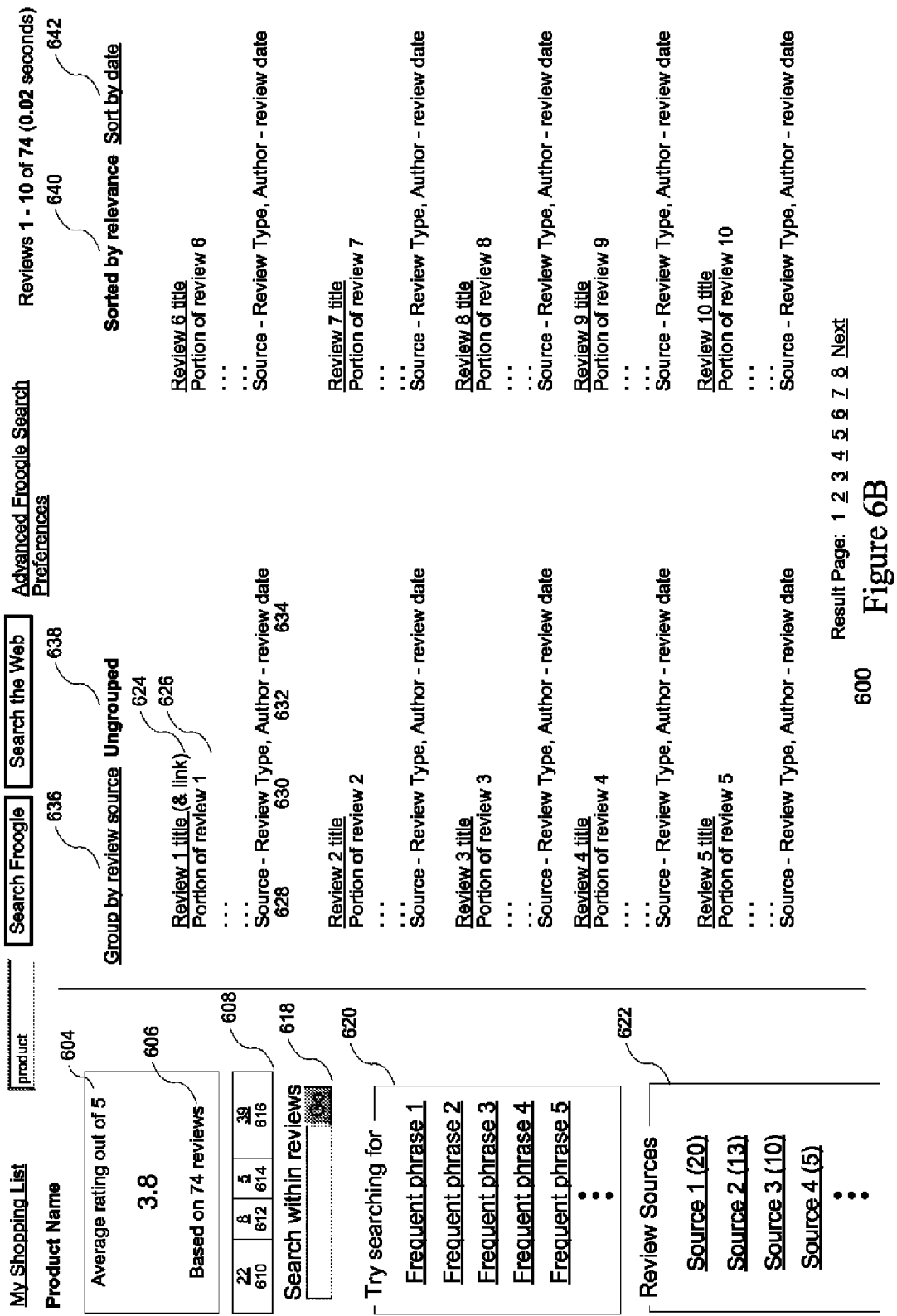

As shown in FIG. 6B, aggregated review 600 includes portions of reviews 626 for the product and a search input area 618 for entering search terms to search for reviews of the product that contain the search terms. Search input area 618 is used to enter search terms for a search that requests only results that are within the reviews for the product. In some embodiments, aggregated review 600 includes a histogram 608 of review ratings for the product, an aggregate rating 604 for the product, and/or the number 606 of reviews for the product. In some embodiments, aggregated review 600 is displayed in a single Web page.

Searching

In some embodiments, review search module 258 supports two different types of queries: (1) search within the reviews 262 belonging to a single product (e.g. a search for "customer service" in the reviews for a given product) and (2) search all reviews 260 to find a particular product (e.g. a search for "good digital camera"). Aggregated review 600, FIG. 6B, shows a search input area 618 for the first type of search.

For the first type of search, a variety of user initiated activities can start the search process, including the user entering search terms in search input area 618, selecting a hyperlink for a frequently appearing phrase 620, selecting a hyperlink to a review source 622, or selecting a hyperlinked portion (e.g., 610, 612, 614, or 616) of histogram 608.

In response to this user-initiated activity, client 104 sends (502, FIG. 5) a request to search within a plurality of reviews for a particular product.

Figure 5:
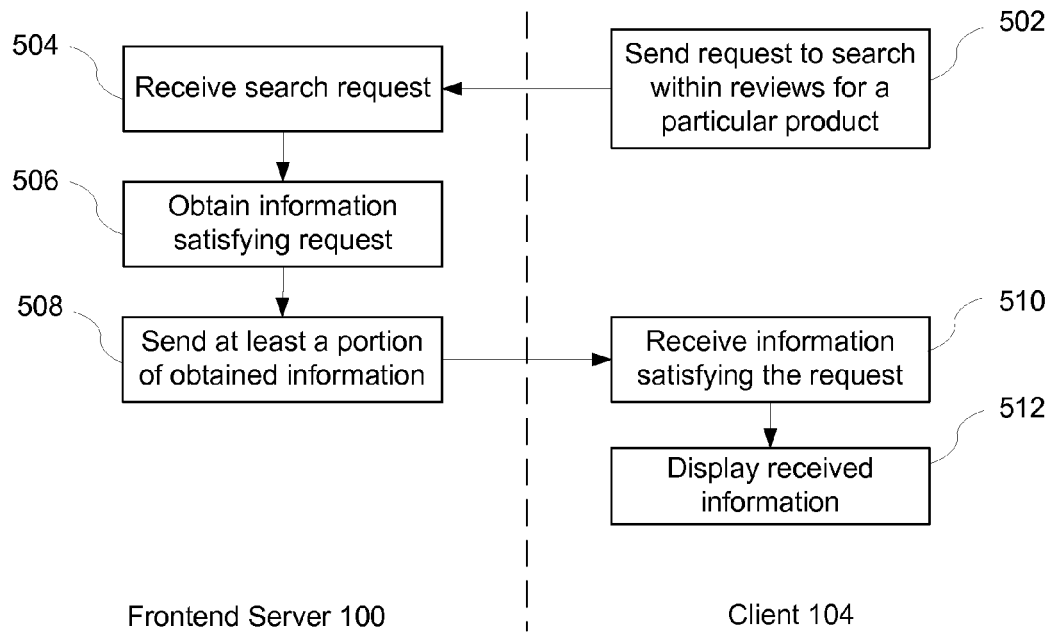
FIG. 5 is a flowchart representing a method for searching aggregated reviews for a product according to one embodiment.

Referring to FIG. 5, frontend server 100 receives (504) the search request from client 104 and obtains (506) information satisfying the request. In some embodiments, the information is obtained by review search module 258 sending two queries to reviews database 242. In the first query, all individual reviews (sometimes called "documents") that contain the search terms are found. When searching within reviews for a single product, the first query is restricted to the main body (e.g., the "review content" fields) of the reviews index 250, and only to individual reviews that belong to the product (cluster). For example, the query "customer service" for reviews in cluster 1234 would be translated to the following:

query restricts:ClusterID=1234,body:(customer service).

A second query is then issued to obtain portions of all reviews that are to be displayed. The ordering preferences submitted by the user (e.g., by clicking on 636, 638, 640, and/or 642) as well as the start position are used to determine which reviews to display. When the number of reviews for a product exceeds the maximum number of review portions to be displayed on a single web page, the start position indicates the ordinal number within an ordered set of reviews at which to begin formatting reviews for display.

Frontend server 100 sends (508, FIG. 5) at least a portion of the obtained information to client 104.

Figure 6C:
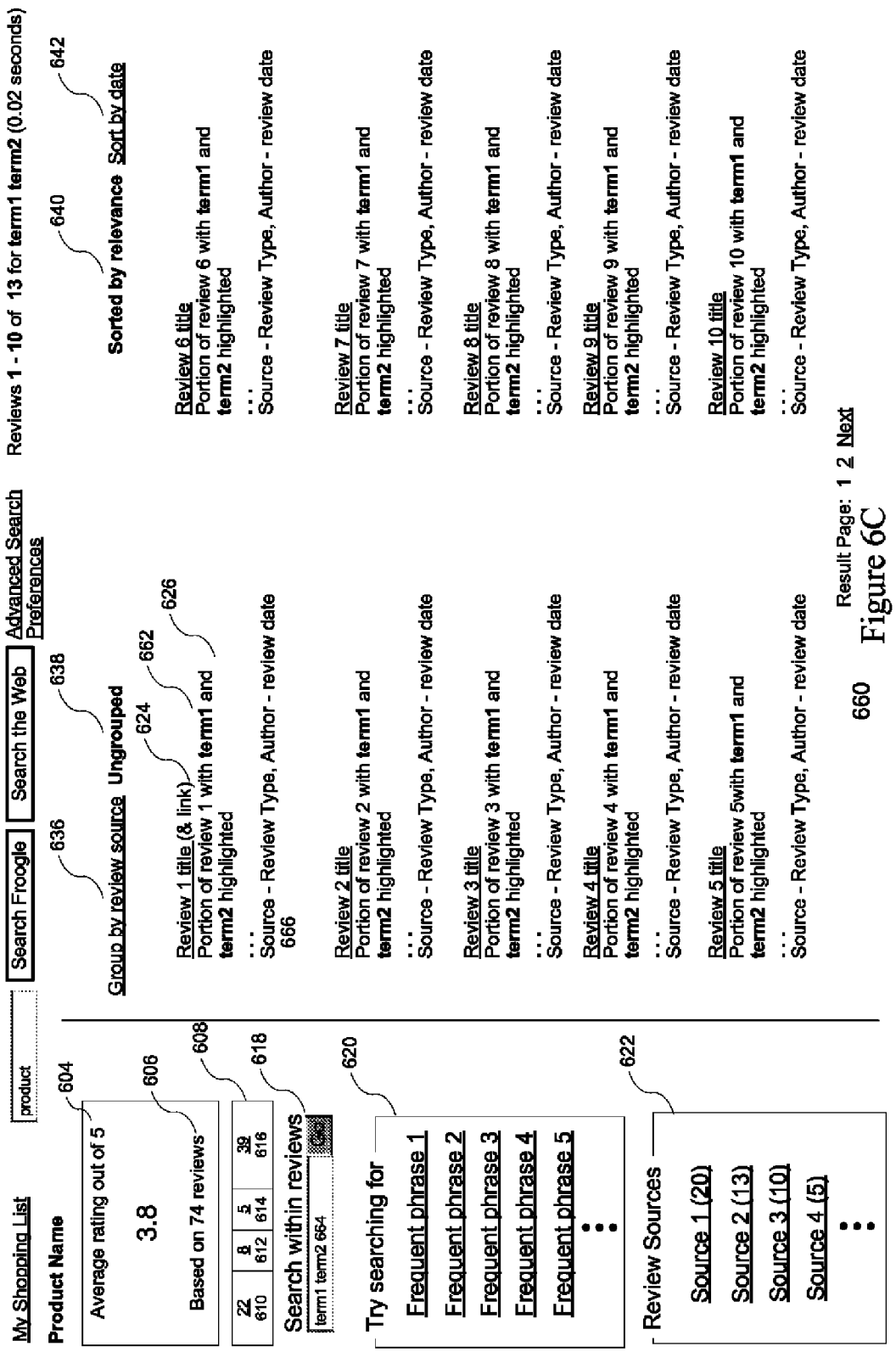

Client 104 receives (510) information satisfying the request and displays (512) the received information, e.g. in web page 660, FIG. 6C. In some embodiments, Client 104 displays at least portions 662 of reviews of the product matching the search terms 664.

The information sent by frontend server 100 and received by client 104 includes at least portions 662 of reviews for the particular product that satisfy the search request. In some embodiments, this information includes the identities 666 of the review sources contributing to the sent information.

For the second type of search, the information is also obtained by review search module 258 sending two queries to reviews database 242. In the first query, all individual reviews that contain the search terms are found, without restricting the search to a particular product (cluster). In some embodiments, the results of the first query are grouped by cluster (product). A second query is then issued to obtain portions of at most three (or some other small number) reviews in each cluster, which are restricted to be from different publishers. In some embodiments, information about each of the clusters, such as the total number of reviews and the average rating, is also requested, obtained, and sent for display.

Graphical User Interface

The graphical user interface 600 (FIG. 6B) on client computer 104 comprises a plurality of portions 626 of reviews for a product and a search input area 618 for entering search terms to search for reviews of the product that contain the search terms. In some embodiments, the plurality of portions of reviews can be grouped by review source 636, sorted by date 642, and sorted by relevance to the search input 640, or sorted by quality of review when the user has not provided a search input. In some embodiments, more or fewer sorting and grouping options may be provided for sorting and/or grouping the reviews.

In some embodiments, graphical user interface 600 also includes, either alone or in various combinations: an aggregate rating 604 for the product; a list of suggested search terms 620; a list of sources 622 for the reviews that link back to the source Web sites or to the corresponding reviews; at least one user selectable link for sorting the portions of reviews by date 642 or relevance to the search input 640, and/or for grouping the portions of reviews by source 636; and/or a histogram 608 of reviews for the product. In some embodiments, clicking on a region (e.g., 610, 612, 614, or 616) in the histogram automatically generates portions of at least some of the reviews corresponding to the histogram region. For example, clicking on region 616 may generate a new display showing portions of reviews having high ratings for the product.

An aggregated rating 604 is given to the product by calculating an average over all reviews for the product. The ratings in the individual reviews 244 and in the aggregated reviews 246 are normalized, e.g., to a 0-1 or 0-5 scale. In some embodiments, after a search within reviews for a product 262, the aggregated rating 604 and number 606 of reviews are changed to reflect the average rating and number of reviews matching the search. This change in the aggregated rating can help users answer questions like, "How do reviewers that discuss 'customer service' rate this product?" In some other embodiments, the aggregated rating 604 and number 606 of reviews are not changed to reflect the average rating and number of reviews matching the search.

Commonly used phrases (e.g., unigrams, bigrams or trigrams) appearing in the reviews for the product are displayed as a list of suggested search terms 620. Phrases that contain the product name and stop-words (such as "the") are removed to improve the quality of the suggested search terms. Clicking on one of the phrases results in displaying just the reviews that contain the user selected phrase. This is equivalent to entering the phrase into the search box 618 with quotes around the phrase and then initiating a search. Showing these phrases gives the user a good idea which aspects of the product are most frequently discussed in the product reviews, and thus which aspects of the product might be important to know about.

The list of review sources 622 includes links to the sites from which reviews for the product have been obtained, or a subset thereof. In some embodiments, after a search within reviews for a product, the list of review sources 622 just includes links to the sites from which reviews matching the search have been obtained, or a subset thereof. In some embodiments, the links lead to the main pages for the given product on each source web site. In some embodiments, the links lead to the product reviews matching the search.

A histogram 608 with a rating distribution of the reviews includes the number of reviews that are unrated 610 (in some embodiments, displayed as a gray area), negative 612 (in some embodiments, displayed as a red area), neutral 614 (in some embodiments, displayed as a yellow area) and positive 616 (in some embodiments, displayed as a green area). In some embodiments, the rating distribution is displayed as a flat histogram, where the length of each colored bar is proportional to the number of reviews in the category. Clicking on a histogram results in a search 262 that just shows the corresponding reviews, e.g. clicking on the red bar 612 results in showing just the negative reviews.

Search input area 618 allows a user to enter arbitrary search terms for the search within reviews for a given product. As shown in FIG. 6C, in some embodiments the search terms are highlighted in portions of reviews 626 that match the search query.

User selectable links permit the displayed list of reviews to be sorted in various ways, such as by:

Relevance 640: In some embodiments, editorial reviews are listed before user reviews. In some embodiments, the reviews are sorted by their length and information content, e.g., sorted by Review-per-word-entropy* sqrt(Review-Length). Other scoring functions, such as scoring reviews by an "information retrieval" score, can also be used.

Date 642: The reviews are sorted by date, with the newest reviews coming first. Reviews for which a date is unknown may be listed at the end.

Figure 6D:
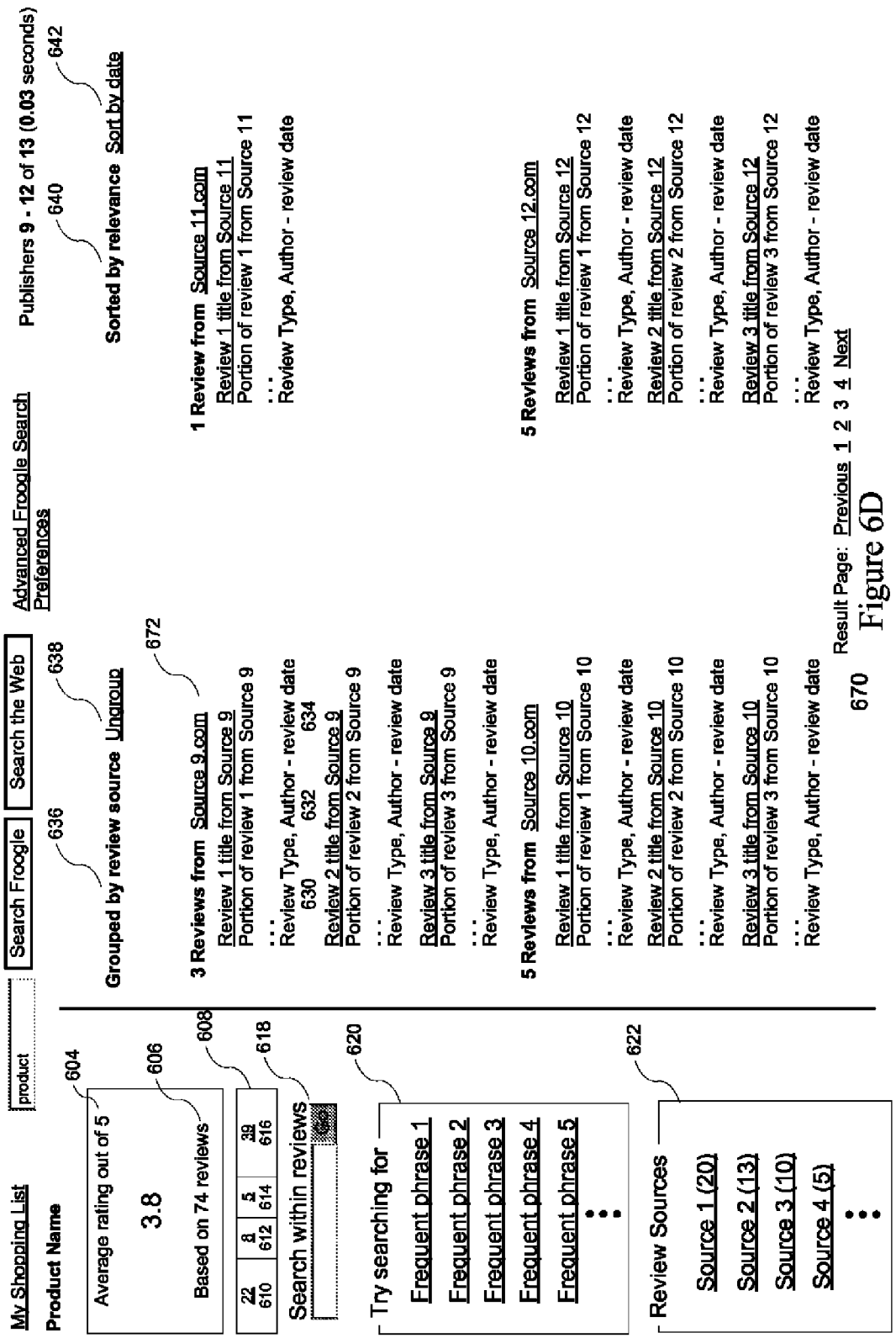

Review Source 636: Reviews are grouped by review site, as represented by screen shot 670 in FIG. 6D, with at most N reviews (e.g., 3, 4 or 5, or some other small number) shown for each review site. At the top of each group, a link 672 to the corresponding review site is provided, which may be the same as the link provided to the site in the list of review sources 622.

Ungrouped 638 (e.g., not grouped by review source). This view is similar to traditional search result displays. Reviews are listed (i.e., portions of the reviews are displayed) one-by-one in a selected order (e.g., by date or relevance) and reviews from different sources are mixed (i.e., without grouping the portions of reviews by source).

Location (not shown in aggregated review 600, FIG. 6B). This view permits reviews to be sorted by location (e.g., for reviews of restaurants, local businesses, movies or other products near a particular location, such as by address, city, region, or mailing or zip code).

In some embodiments, for reviews listed in an aggregated review (e.g., graphical user interface 600 or 670) or reviews listed as results for a search within reviews for a product (e.g., graphical user interface 660, FIG. 6C) the following information is displayed: review title 624, a portion 626 of the review (e.g., a snippet), the source of the review 628, the date of the review 634, the type of review 630 (e.g., whether it is an editorial user contributed review), and the name of the reviewer 632. The portion or snippet 626 of each review may be generated using the same or similar techniques to those used to generate snippets of search results in an Internet search engine such as the Google search engine. For example, when a graphical user interface is presenting reviews for a product, the portion of each review shown may be a portion matching one or more search terms that were used to select the reviews to be displayed. Alternately, the portion of each review shown may be a beginning portion of the review. In yet another embodiment, the portion of each review shown may be a portion determined by an automatic process to be a summary or most important portion of the review.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method comprising: at a client having one or more processors and memory storing one or more programs for execution by the one or more processors:
   sending a request for an aggregated review of a product to a remote server,
   receiving the aggregated review of the product from the remote server, wherein the aggregated review of the product is derived from a plurality of reviews of the product that are extracted from web pages,
   displaying the aggregated review of the product, wherein the aggregated review of the product includes:
      portions of multiple reviews of the product, wherein a respective review of the product provides a subjective evaluation of the product by a human, and
      a list of phrases related to the product, wherein the phrases are automatically selected from a plurality of reviews of the product in accordance with their respective weighted occurrences in the reviews,
   detecting selection of a phrase in the list of phrases; and
   in response to detecting selection of the phrase in the list of phrases, displaying, in the aggregated review of the product, just portions of reviews of the product from reviews that contain the selected phrase.

2. The computer-implemented method of claim 1, wherein the aggregated review of the product includes a first aggregate rating for the product, and the method further includes displaying a second aggregate rating of reviews matching the selected phrase.

3. The computer-implemented method of claim 1, wherein the aggregated review of the product includes a first number of reviews of the product, and the method further includes displaying a second number of reviews matching the selected phrase.

4. The computer-implemented method of claim 1, wherein the aggregated review of the product includes a first list of review sources that link back to source web sites or to reviews corresponding to the product, and the method further includes displaying a second list of review sources that link back to source web sites or to reviews matching the selected phrase.

5. The computer-implemented method of claim 1, wherein the aggregated review of the product is displayed in a single Web page.

6. The computer-implemented method of claim 1, wherein the request is sent in response to a user initiated activity.

7. The computer-implemented method of claim 6, wherein the user initiated activity comprises activating a hyperlink.

8. A computer-implemented method comprising: at a server having one or more processors and memory storing one or more programs for execution by the one or more processors,
   receiving a request for an aggregated review of a product from a client,
   obtaining the aggregated review of the product, wherein the aggregated review of the product is derived from a plurality of reviews of the product that are extracted from crawled Web pages, and
   sending the aggregated review of the product to the client for display,
   wherein the aggregated review of the product includes:
      portions of multiple reviews of the product, wherein a respective review of the product provides a subjective evaluation of the product by a human, and
      information for displaying a list of phrases related to the product, wherein the phrases are automatically selected from a plurality of reviews of the product in accordance with their respective weighted occurrences in the reviews such that a user selection of a phrase in the list of phrases causes a display of just portions of reviews of the product from reviews that contain the selected phrase in the aggregated review of the product at the client.

9. The computer-implemented method of claim 8, further comprising:
   indexing individual and aggregated product reviews to produce a reviews index, wherein the reviews index maps search terms to reviews; and
   storing the reviews index.

10. The computer-implemented method of claim 8, wherein the aggregated review of the product includes a first aggregate rating for the product, and the method further includes, sending to the client information for displaying a second aggregate rating of reviews matching the selected phrase.

11. The computer-implemented method of claim 8, wherein the aggregated review of the product includes a first number of reviews of the product, and the method further includes sending to the client information for displaying a second number of reviews matching the selected phrase.

12. The computer-implemented method of claim 8, wherein the aggregated review of the product includes a first list of review sources that link back to source web sites or to reviews corresponding to the product, and the method further includes sending to the client information for displaying a second list of review sources that link back to source web sites or to reviews matching the selected phrase.

13. A system comprising at least one server, the system comprising:
one or more processors; and
memory;
wherein said at least one server is configured to:
receive a request from a client for an aggregated review of a product;
obtain the aggregated review of the product, wherein the aggregated review of the product is derived from a plurality of reviews of the product that are extracted from crawled Web pages; and
send the aggregated review of the product to the client for display,
wherein the aggregated review of the product includes:
portions of multiple reviews associated with the product, wherein a respective review of the product provides a subjective evaluation of the product by a human, and
information for displaying a list of phrases related to the product, wherein the phrases are automatically selected from a plurality of reviews of the product in accordance with their respective weighted occurrences in the reviews such that a user selection of a phrase in the list of phrases causes a display of just portions of reviews of the product from reviews that contain the selected phrase in the aggregated review of the product at the client.

14. The system of claim 13, wherein said at least one server is configured to:
index individual and aggregated product reviews to produce a reviews index, wherein the reviews index maps search terms to reviews; and
store the reviews index.

15. The system of claim 13, wherein the aggregated review of the product includes a first aggregate rating for the product, and said at least one server is configured to send to the client information for displaying a second aggregate rating of reviews matching the selected phrase.

16. The system of claim 13, wherein the aggregated review of the product includes a first number of reviews of the product, and said at least one server is configured to send to the client information for displaying a second number of reviews matching the selected phrase.

17. The system of claim 13, wherein the aggregated review of the product includes a first list of review sources that link back to source web sites or to reviews corresponding to the product, and said at least one server is configured to send to the client information for displaying a second list of review sources that link back to source web sites or to reviews matching the selected phrase.

18. A non-transitory computer readable storage medium having stored thereon data representing sequences of instructions, which when executed by a server system having one or more processors and memory, cause the server system to:
receive a request for an aggregated review of a product from a client;
obtain the aggregated review of the product, wherein the aggregated review of the product is derived from a plurality of reviews of the product that are extracted from crawled Web pages; and
send the aggregated review of the product to the client for display,
wherein the aggregated review of the product includes:
portions of multiple reviews associated with the product, wherein a respective review of the product provides a subjective evaluation of the product by a human, and
information for displaying a list of phrases related to the product, wherein the phases are automatically selected from a plurality of reviews of the product in accordance with their respective weighted occurrences in the reviews such that a user selection of a phrase in the list of phrases causes a display of just portions of reviews of the product from reviews that contain the selected phrase in the aggregated review of the product at the client.

19. The non-transitory computer readable storage medium of claim 18, wherein the aggregated review of the product includes a first aggregate rating for the product, and said at least one server is configured to send to the client information for displaying a second aggregate rating of reviews matching the selected phrase.

20. The non-transitory computer readable storage medium of claim 18, wherein the aggregated review of the product includes a first number of reviews of the product, and said at least one server is configured to send to the client information for displaying a second number of reviews matching the selected phrase.

21. The non-transitory computer readable storage medium of claim 18, wherein the aggregated review of the product includes a first list of review sources that link back to source web sites or to reviews corresponding to the product, and said at least one server is configured to send to the client information for displaying a second list of review sources that link back to source web sites or to reviews matching the selected phrase.

* * * * *